(12) United States Patent
Ghosh et al.

(10) Patent No.: US 11,927,774 B2
(45) Date of Patent: Mar. 12, 2024

(54) ADAPTABLE LENSES FOR SMART EYEGLASSES

(71) Applicant: NewEyes, Inc., Salt Lake City, UT (US)

(72) Inventors: Tridib Ghosh, Salt Lake City, UT (US); Apratim Majumder, Salt Lake City, UT (US)

(73) Assignee: NewEyes, Inc., Salt Lake City, UT (US)

( * ) Notice: Subject to any disclaimer, the term of this patent is extended or adjusted under 35 U.S.C. 154(b) by 500 days.

(21) Appl. No.: 17/416,398

(22) PCT Filed: Dec. 20, 2019

(86) PCT No.: PCT/US2019/068147
§ 371 (c)(1),
(2) Date: Jun. 18, 2021

(87) PCT Pub. No.: WO2020/132629
PCT Pub. Date: Jun. 25, 2020

(65) Prior Publication Data
US 2022/0187507 A1    Jun. 16, 2022

Related U.S. Application Data

(60) Provisional application No. 62/784,425, filed on Dec. 22, 2018.

(51) Int. Cl.
*G02B 3/14* (2006.01)
*G02B 27/01* (2006.01)
*G02C 7/08* (2006.01)

(52) U.S. Cl.
CPC .......... *G02B 3/14* (2013.01); *G02B 27/0172* (2013.01); *G02B 27/0176* (2013.01); *G02C 7/085* (2013.01); *G02B 2027/014* (2013.01)

(58) Field of Classification Search
CPC .. G02B 3/14; G02B 27/0172; G02B 27/0176; G02B 2027/014; G02C 7/085
USPC .......................................................... 359/666
See application file for complete search history.

(56) References Cited

U.S. PATENT DOCUMENTS

| 2010/0202054 A1* | 8/2010 | Niederer | G02B 3/14 359/666 |
| 2018/0136372 A1* | 5/2018 | Patscheider | G02B 5/06 |
| 2018/0267294 A1* | 9/2018 | Aschwanden | H02K 33/00 |

(Continued)

FOREIGN PATENT DOCUMENTS

WO    2017120475 A1    7/2017

*Primary Examiner* — William R Alexander
(74) *Attorney, Agent, or Firm* — Dobbin IP Law, P.C.; Geoffrey E. Dobbin, Esq.

(57) ABSTRACT

An adaptive lens (200) may feature two flexible films (202), (204) secured within a rim (210) and defining a space therebetween which is filled with an appropriate fluid (206). A piston (220), driven by at least one actuator (214a-c), may be attached to one of the films (204) to displace it with respect to the remainder of the assembly. Such action of the piston (220) distorts both films (202), (204) to change the shape of the lens and may be driven by bimorph actuators (214a-c). Distance of displacement may be calculated by measuring a magnetic field created by at least one magnet (222a-c) attached to the piston (220). Feedback control may be used to stabilize the apparatus.

9 Claims, 6 Drawing Sheets

(56) References Cited

U.S. PATENT DOCUMENTS

2021/0149087 A1\* 5/2021 Aschwanden ....... G02B 15/142
2021/0389551 A1\* 12/2021 Jang ..................... G02B 13/001

\* cited by examiner

ADAPTABLE LENSES FOR SMART EYEGLASSES

CROSS-REFERENCES TO RELATED APPLICATIONS

This application claims priority under 35 U.S.C. § 371 as a national stage application of prior filed PCT application PCT/US2019/068147, filed Dec. 20, 2019, which in turn claims priority to prior filed U.S. Application 62/784,425, filed Dec. 22, 2018. This Application incorporates both prior applications by reference herein in their entirety.

FIELD OF THE INVENTION

The present invention relates to the field of optics and more particularly relates to a lens that adapts its power to a given viewing range, which may be utilized in eyeglasses.

BACKGROUND OF THE INVENTION

The human eye is a complex organ consisting of many distinct parts in order to function. Its basic structure is a generally spherical sac filled with a refractive fluid. An aperture, or pupil, allows light to enter the eye and shine its back wall, on which the retina is located. The retina contains photosensitive cells which generate signals sent to the brain for interpretation. The pupil changes in size, usually due to lighting conditions, through the action of the iris. A clear cornea covers the pupil and iris. Beneath the pupil resides a crystalline lens to aid in the focusing of light to properly strike the retina.

Because the eye is a complex organ, many problems may develop which can affect a person's eyesight. Myopia (near-sightedness) and hyperopia (farsightedness) are common in all ages and may be caused my misshapenness in any part of the eye. Astigmatism is a distortion in vision caused by a misshapen cornea. Cataracts are caused by the crystalline lens becoming cloudy over time. Presbyopia is the inability of the crystalline lens to adapt to different focal lengths, particularly to distances within arm's length. Over time, the crystalline lens loses its adaptive ability ("accommodative amplitude"). This accommodative amplitude ranges from up to 15 diopters in the first 20 years or so of a human's life to as low as 0.5 diopters by age 50 and it is experienced almost universally in all cultures, ethnicities, and social-economic strata.

The treatment of presbyopia is usually accomplished by using eyeglasses, particularly with multi-focal lenses. Multi-focal lenses are first credited as the invention of Benjamin Franklin in the late 18th century when he created bifocal lenses. Since this time, the major developments in the technology have been to create trifocal lenses, lineless bifocal lenses, and progressive lenses, all of which accomplish the same effect by utilizing the same strategy: to create a lens with specific zones through which a user must look in order to see clearly at a particular range. Usually, a major portion of the lens is manufactured to accommodate the most used range, usually far-distance for driving or mid-distance for office work, and the bottom of the lens is manufactured for reading and other close-up ranges. While these lenses provide a solution to presbyopia problems, they inevitably produce a reduced field of view causing the user to move his head such that the object of interest lays within the appropriate "in-focus" region of the lens.

The use of an adaptive lens is a recent development in the treatment of presbyopia. One state-of-the-art adaptive lens is described in WO2017/120475 (Low-Power Large Aperture Adaptive Lenses for Smart Eyeglasses by Mastrangelo, et al.). This entire publication is incorporated by reference herein in its entirety, but a summary follows herein. The concept of the Mastrangelo adaptive lens (FIG. 1) is that two clear membranes are fused together in a manner that leaves a hollow interior. This interior is filled with a fluid having a high refractive index (approximately 1.4 in the prior art). One lens membrane is connected to a piston which is actuated by one or more piezoelectric bimorph actuators. As the piston moves, it carries the membrane attached to it and thereby changes the shape and optical power of the lens. When a user's visual prescription is known, sensors in eyeglass frames are meant to measure the distance between the user and focal object and send this information to a contained CPU, which then directs a voltage across the bimorph actuators. The voltage is calculated to generate a given movement within the bimorph actuators to change the lens shape to match the measured distance and the user's prescription and allow the user to see at the measured distance clearly. This strategy has the distinct advantage over older prior art in that the user does not lose focus in any large areas of the visual field thus restoring accommodation as a normal eye does. Therefore, these adaptive lenses do not need any training period as needed for multi-focal lenses and the user may look though the center portion of the eyeglass lens without regard to distance of the focal object away from the user.

While the Mastrangelo lens is the current state of the art, it does have some drawbacks. The most pressing is that its current preferred construction is not resilient with consistent use. Experiments show a 0.5 diopter drift in adaptive power over the course of as little as six months. The usual target for eyeglass lifespan is three years and this would eventually cause up to a 3 Diopter shift in power over this time span. For comparison, lenses for most reading glasses typically range from +1.00 to +4.00 diopters while correction of simple myopia (near-sightedness) typically sees a maximum of −3.00 diopters in lens strength. The diopter drift in the prior art may be attributed to fatigue, both in the lens membrane material and the bimorph actuators. A more suitable target would be a total of 0.25 Diopters over the same three-year lifespan (83 mD/yr). One difficulty of the prior art is found in material fatigue. It is believed that 90% of the above-described power drift which has been measured by the present inventors is attributable to the choice of membrane. This alone would still be almost six times greater the desired 83 mD/year. The remaining 10% is believed to originate from fatigue or degradation in the bimorphs. What is needed is a more stable methodology to improve upon the original Mastrangelo lens.

The present invention is an adaptive lens with a more durable lens construction and a more stable piston displacement methodology. The present invention represents a departure from the prior art in that the adaptive lenses of the present invention allows for more stable and repeatable lens permutations over time and an eyeglass that could potentially last the entire three-year target lifetime of prescription eyeglasses.

SUMMARY OF THE INVENTION

In view of the foregoing disadvantages inherent in the known types of adaptive lenses, an improved adaptive lens which may comprise at least one, if not two, inorganic or organic lens films and a feedback-controlled displacement system in order to accomplish these objectives.

The more important features of the invention have thus been outlined in order that the more detailed description that follows may be better understood and in order that the present contribution to the art may better be appreciated. Additional features of the invention will be described hereinafter and will form the subject matter of the claims that follow.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in many ways. Also, it is to be understood that the phraseology and terminology employed herein are for description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

With reference now to the drawings, a preferred embodiment of the adaptive lens is herein described. It should be noted that the articles "a", "an", and "the", as used in this specification, include plural referents unless the content clearly dictates otherwise.

Figure 1:
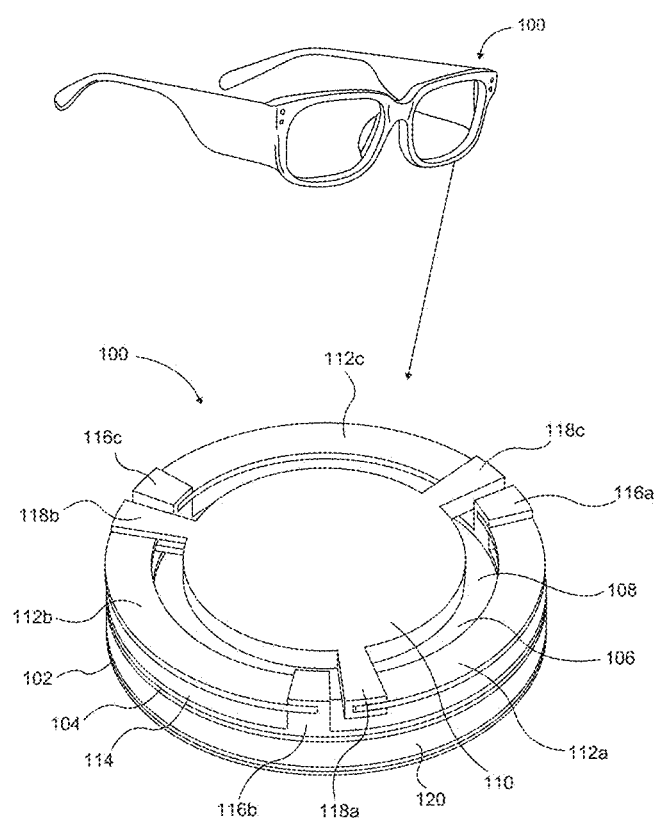
FIG. 1 is a perspective view of a prior art Mastrangelo-type lens.
Figure 2:
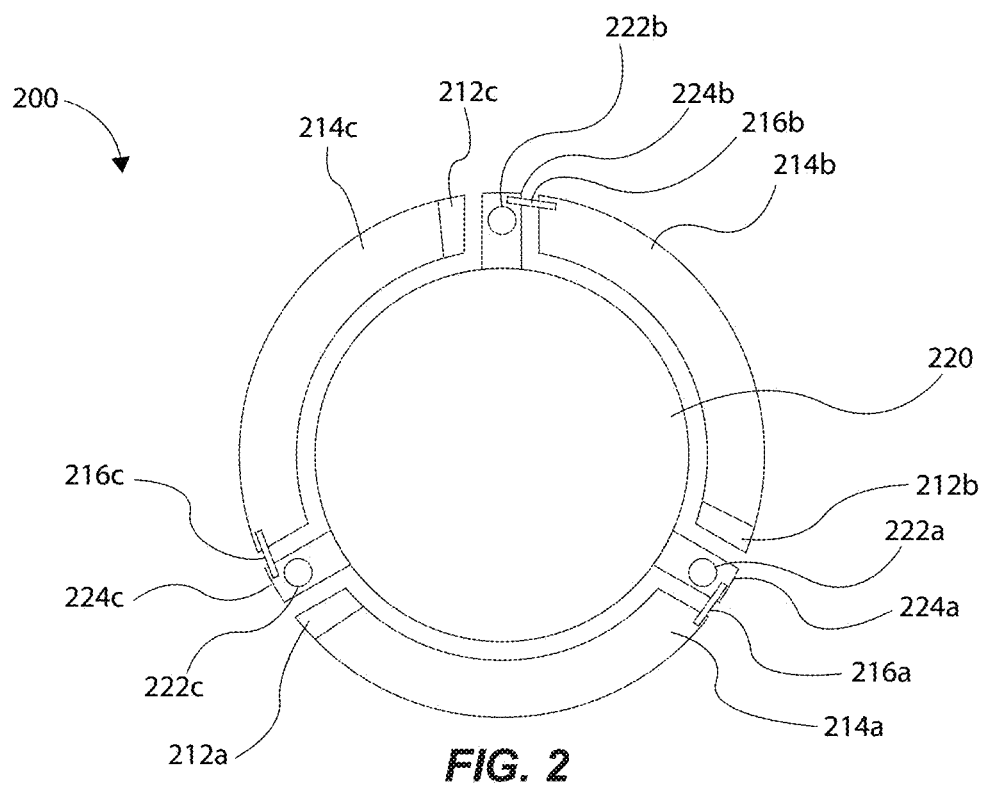
FIG. 2 is a schematic view of an adaptive lens coupled with a magnetic field-based control apparatus, forming an adaptive lens assembly.

With reference to FIG. 1, the prior art features an adaptive lens 100 which may be utilized in a pair of eyeglasses. The lens 100 generally has two transparent membranes 102, 104 which define a chamber 106 therebetween. Membranes 102, 104 may be supported and sealed to a frame 114. The prior art recommends polydimethylsiloxane (PDMS) as the material from which the membranes are constructed. An optically transparent liquid 108 is disposed within the chamber 106 and a transparent piston 110 is affixed to one membrane 104. A circumferential wall 120 surrounds the membranes 102, 104 to aid in support and possibly sealing them together. The wall also provides supports 116a-c for actuators 112a-c which are attached to the piston 110 at joints 118a-c. The actuators are preferred to be bimorph piezoelectric actuators which will respond to voltage placed across them. Depending on the voltage, the actuators will move the piston away from the main body of the lens, or into it, thus forming different shaped lenses which will accommodate a user's prescription for a given, measured distance to the focal object.

Basic Operation of an Adaptive Lens.

As shown in FIGS. 2-5, an adaptive lens 200 may be constructed with a frame 210 supporting inner 204 and outer 202 films. A space defined between the films is filled with a clear fluid 206. The refractive index of the fluid would be dependent upon the needs of the lens, with a preference to those with a higher refractive index than water (1.333). A transparent piston 220 is attached to the inner film 204. Together, films 202, 204, fluid 206, and piston 220 form a compound lens with will be adaptive as the piston 220 moves relative to the frame 210.

Figure 3:
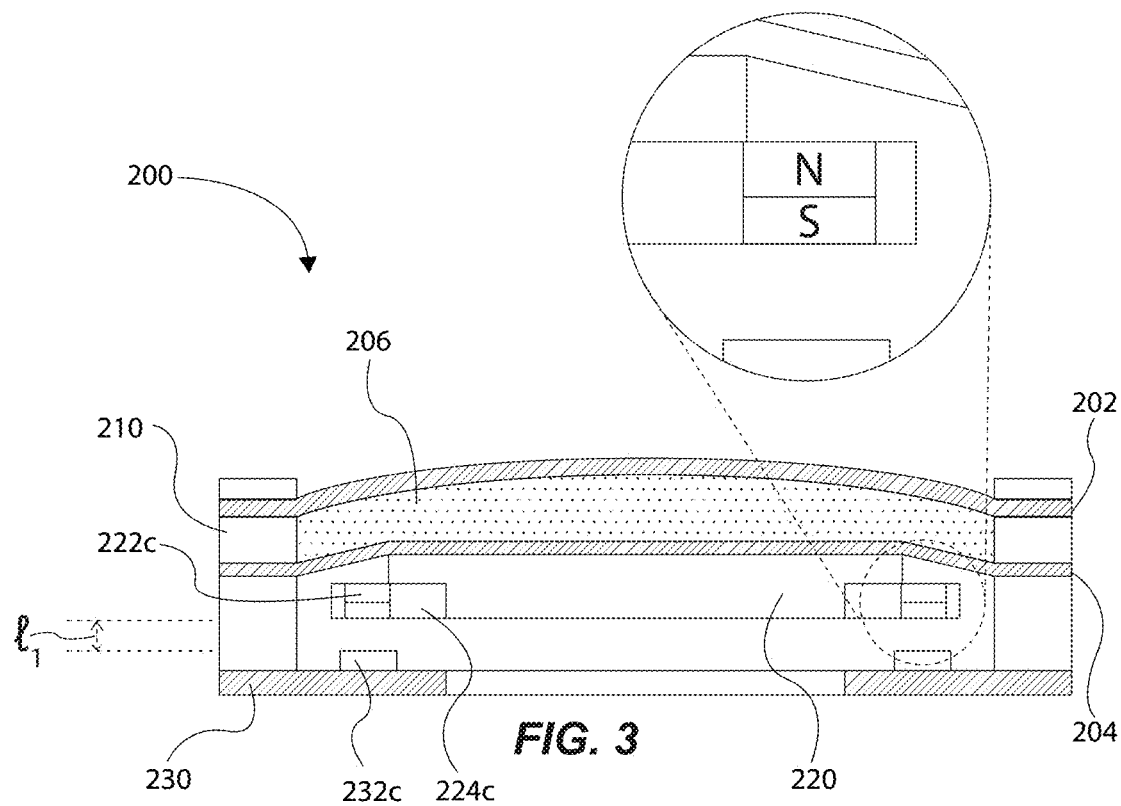
FIG. 3 is a schematic view of the adaptive lens of FIG. 2 in a plano-convex setting.
Figure 4:
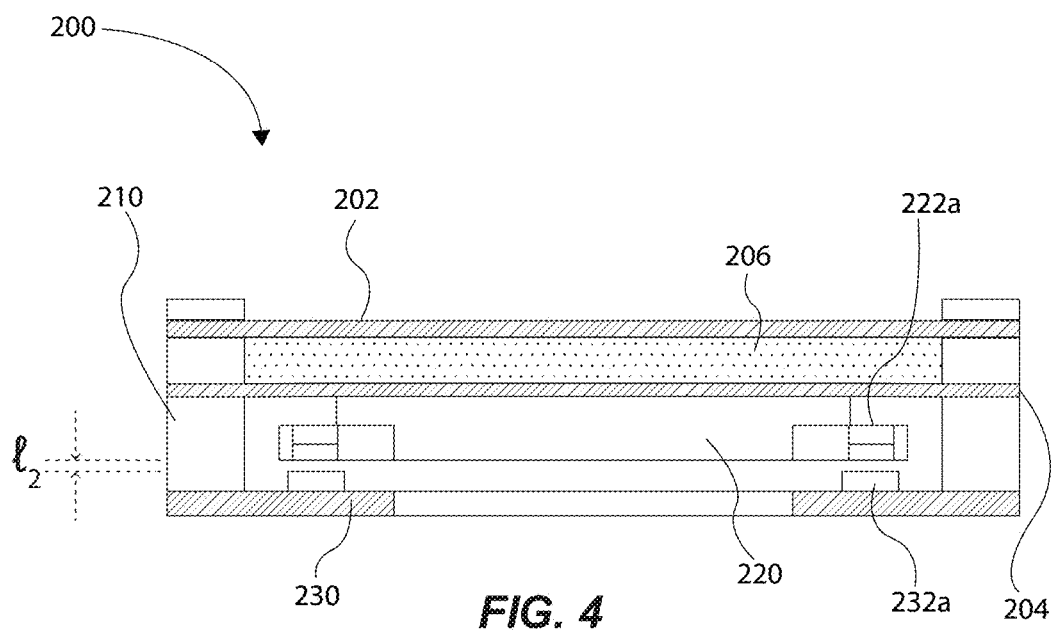
FIG. 4 is a schematic view of the adaptive lens of FIG. 2 in a planar setting.
Figure 5:
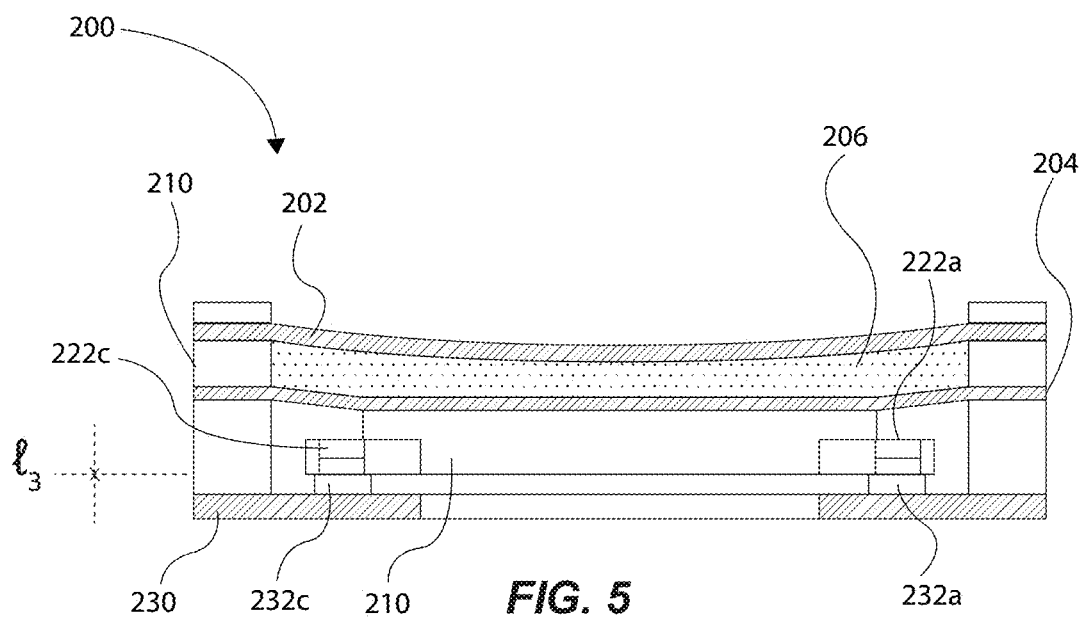
FIG. 5 is a schematic view of the adaptive lens of FIG. 2 in a plano-concave setting.

The piston 210 may be supported by at least one actuator 214a-c. A preference is given to piezoelectric bimorph actuators, as is found in the prior art. Each actuator 214a-c is supported by an anchor 212a-c on a substrate, which may be a circuit board 230. As the goal is for the lenses to be seen through, the substrate may define an aperture through which a wearer could see. An aperture of about 30 mm would be sufficient for most adult eyeglasses. Connection to the piston may be accomplished by any means known or later developed, but the use of a linkage 216a-c to attach each actuator 214a-c to individual support tabs 224a-c on the piston 210 would suffice. Each tab 224a-c would then also support a small magnet 222a-c with a measurable magnetic field B. The substrate 230 would also support magnetometers 232a, 232c for each magnet. In FIG. 3, the transparent piston 220 pushes the inner lens film 204 towards outer lens film 202, as the liquid 206 is not compressible, this action forces the outer film 202 to bulge, forming a plano-convex lens with both films, the liquid 206 and piston 210 being components thereof. In FIG. 4 the transparent piston 210 pulls the inner lens film 204 until both the inner 204 and outer films are roughly parallel while continuing to pull inner film 204 away from outer film 202 will draw outer film 202 inwards, forming a plano-concave lens (FIG. 5). In each case, the distance ($l_1$, $l_2$, $l_3$) between the piston 210 and the magnetometers 232a, 232c on the substrate 230 will be different for each lens formation, which will in turn represent a different prescription strength. Sensors may be mounted upon the eyeglass frames with data fed to a microprocessor which will then control the voltage across the bimorphs and the resultant lens shape. It should be understood that distance sensors would feed data into a microprocessor, which would then determine the approximate distance of the viewer from the viewed object and also direct the voltage across the piezoetectric actuators to adjust the tens for viewing at the determined distance by the viewer.

Solutions to Bimorph Fatigue

The prior art regulates the motion of the bimorphs by regulating the voltage placed across the bimorphs. Unfortunately, as the bimorphs fatigue, this causes each successive use to become successively less and less effective. A more efficient and stable approach is to directly measure the displacement of the in bimorphs rather than the voltage utilized. In so doing, appropriate voltage may be applied based on distance measurement in order to achieve a desired result, rather than hoping a set voltage achieves the target deflection. Direct measurement of the piezo and piston deflection is an excellent way to control the lens power as to first order the optical power change ΔP for this type of lens is only dependent on the film dimensions, liquid index n, and the piston deflection Δh:

$$\Delta P = \frac{4(n-1) \cdot r_r^2 \Delta h}{r_o^4} \quad (1)$$

Figure 6:
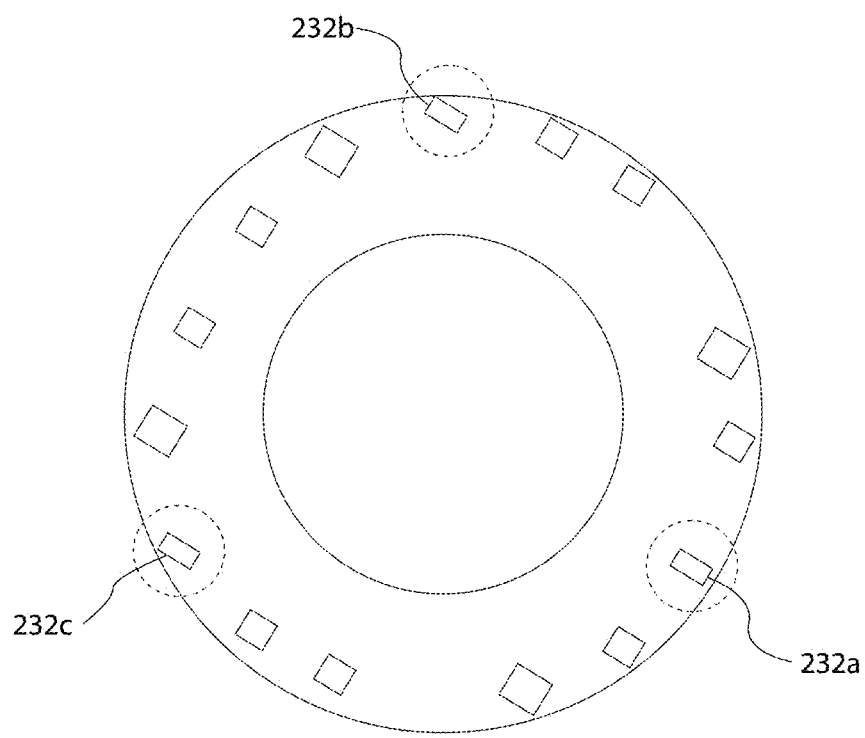
FIG. 6 is a schematic of control circuitry including magnetometer chips for use in the adaptive lens assembly of FIG. 2.
Figure 7:
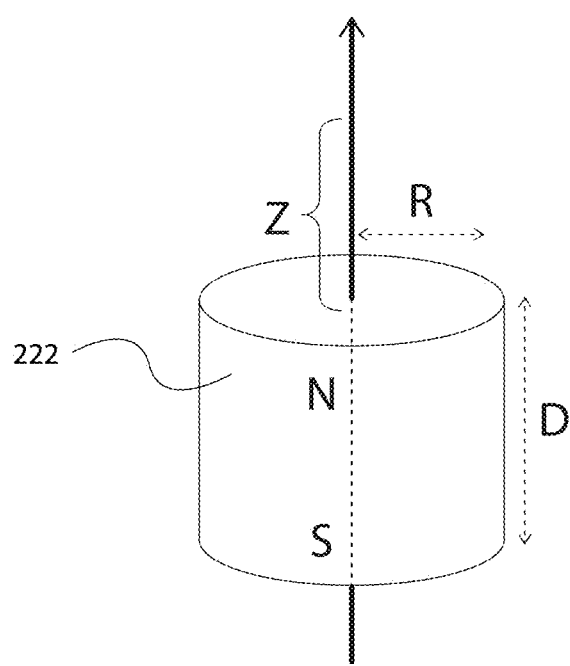
FIG. 7 is a schematic view of a magnet for use in the adaptive lens assembly of FIG. 2.
Figure 8:
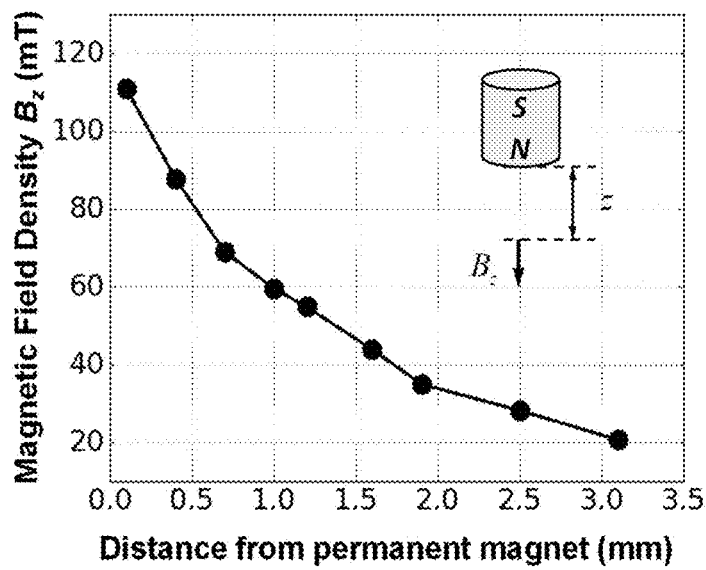
FIG. 8 is a graph depicting magnetic field density as a function of distance.

Direct measurement of deflection may be accomplished by positioning one or more magnets on or in the vicinity of the bimorphs and/or piston (FIG. 5). Piston displacement can then be measured by the strength of the resultant magnetic field at the point of a given sensor 232a-c, which may be located on the circuitry around the lens (FIG. 6). For a given magnet, FIG. 7, the magnetic field density along an axial direction is approximately given by:

$$B_z(z) = \frac{B_r}{2}\left(\frac{(D+z)}{\sqrt{R^2+(D+z)^2}} - \frac{z}{\sqrt{R^z+z^z}}\right) \quad (2)$$

where $B_r$ is the remanence field of a given magnetic material. By measuring the magnetic field density, the distance that the permanent magnet has moved after a given voltage is applied to the bimorphs as this distance z wilt vary with the field in a predictable manner. FIG. 8 shows a typical curve of magnetic field density (in mT) versus magnet displacement (mm). As the strength varies as specified in Eq. (2), it is a relatively simple matter to estimate the piston displacement from the magnetometers via a calibration model or table and/or Eq. (2) or an equation that is a function of the magnet geometry and the magnetometer location.

Figure 9:
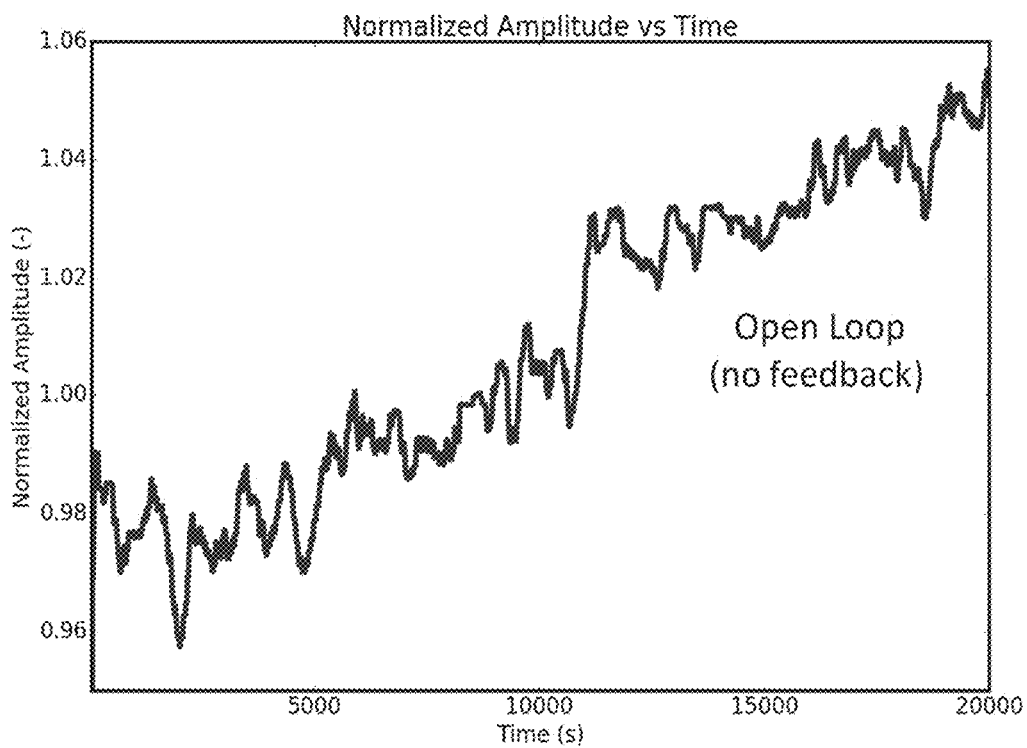
FIG. 9 is a graph showing normalized power amplitude fluctuations of an adaptive lens over time.
Figure 10:
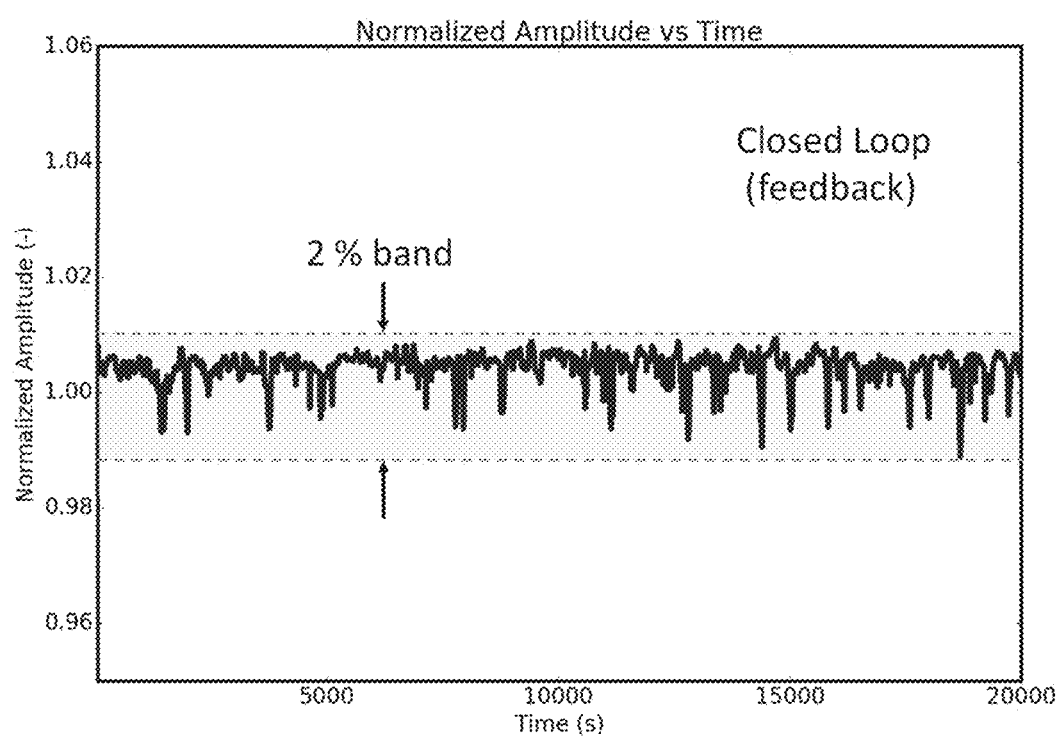
FIG. 10 is a graph depicting normalized power fluctuations of an adaptive lens when feedback control is implemented.

Stability of the system may be achieved by the use of a feedback control subroutine. Without a stabilizing mechanism, the lens power may drift by up to 8% white in use over the course of a day (FIG. 9), creating an unusable product. Fluctuations in the normalized power may be caused by a number of environmental and internal factors which may be reversible or not. An ideal range for fluctuation allowance might be 2-5% as this tends to be the within the usable range of most magnetometers are this time. The use of feedback control can keep power fluctuations within a 2% range which at this time may be deemed acceptable.

Feedback control may be accomplished by first creating a lookup table map or function that relates piston position to measured values of the magnetic field:

$$B = f(z) \quad (3).$$

This table map may be obtained experimentally. When a given lens optical power $P_o$ and ΔP power change is desired, the required piston deflection Δh and piston position are first calculated from Eq. (I). Next the magnetic field $B_o$ corresponding to the position required to achieve that optical power is obtained from Eq. (3). Next, a best guess initial voltage V(0) is applied to the piezo actuators, where the index 0 indicates the initial voltage. That best guess initial voltage is obtained from a pre-measured calibration curve. Upon application of the guess voltage, the magnetic field B(V(0)) is measured by the magnetometers. If the measured B(V(0)) is different than the desired target $B_o$ (corresponding to desired target distance z) then voltage V(1) is corrected such that:

$$V(1) = V(0) + \Delta V(0) \quad (4)$$

where voltage increment ΔV(0) is such as to reduce the magnitude (or the square) of the magnetic field error $(B_o - B(V(0)))$>. The error can be reduced by increasing or decreasing the piezo voltage depending on the sign of the magnetic field error. There are several ways that this can be done. In linear feedback systems one, may use the increment $$\Delta V(0) = a(B_0 - B(V(0))) \quad (5)$$

but other type of increments can be utilized as tong as the overall the magnitude of the magnetic field error is minimized. This process is repeated such that with each successive increment:

$$V(n+1) = V(n) + \Delta V(n) \quad (6)$$

until, the maximum magnetic field error (and target piston position) is reached. The feedback algorithm is implemented ire software at a specific sampling rate.

Other methods of direct measurement include inductive coupling or other integrated detection circuits.

Solutions to the Lens Material

The present invention requires that the lens material de form to create different lens shapes. Most polymers are defined by elasticity and the ability to deform; however, these materials also tend to experience greater fatigue over time. The use of inorganic tens material, which can still deform, may provide a more resilient and stable lens. As such, an appropriate balance between deformation and rigidity is required. A suitable inorganic compound could be silicon nitride. Silicon nitride pellicles may be formed from vapor deposition techniques known in the art and used to form one or both films. When sufficiently thin, on the order of 300 nm, this film is transparent and can withstand a tension of 50 N/m which should be adequate for use in the present invention. Other organic films, such as silicone, polyurethane and polyimides might also prove adequate. At this time, the use of inorganic films is seen as a positive avenue of experimentation but has been cost prohibitive. Organic films have shown similar results to the prior art.

Although the present invention has been described with reference to preferred embodiments, numerous modifications and variations can be made and still the result will come within the scope of the invention. No limitation with respect to the specific embodiments disclosed herein is intended or should be inferred.

INDUSTRIAL APPLICABILITY

The present invention has industrial applicability as it may be made in industry and has particular relevance in the field of vision correction. Many different materials may be used to manufacture the adaptive lens, so long as the lens itself is transparent. Piston materials should be transparent but rigid and a variety of polymers and inorganic crystalline materials could be utilized. Other crystalline materials may be substituted for silicon nitride as further material exploration continues. In any event, these deviations from the present Specification should be considered incorporated into and included in the present invention. It should be readily understood that the polarity and orientation of the magnets and magnetometers are arbitrary and may be switched for purposes of this invention.

What is claimed is:

1. An adaptive lens apparatus comprising:
   two flexible films defining a space therebetween;
   a rim about the films;
   a fluid filling the space between the films;
   a piston for displacing one film with respect to the rim;
   at least one actuator for the purpose of displacing the piston;
   at least one magnet mounted upon the piston; and
   at least one magnetometer to measure a magnetic field created by the magnet at the location of the at least one magnetometer;
   wherein the measured strength of the magnetic field determines the relative distance the piston has been displaced from the magnetometer.

2. The adaptive lens apparatus of claim 1, further comprising a feedback control to stabilize the at least one actuator.

3. The adaptive lens apparatus of claim 2, the feedback control comprising the steps of comparing a standard magnetic field strength to a measured magnetic field strength, and then adjusting the piston to minimize any difference between the measured magnetic field strength and the standard magnetic field strength.

4. The adaptive lens apparatus of claim 3, the films being comprised of thin pellicles of inorganic material.

5. The adaptive lens apparatus of claim 4, the inorganic material being silicon nitride.

6. The adaptive lens apparatus of claim 5, the at least one actuator being piezoelectrically driven.

7. The adaptive lens apparatus of claim 1, the films being comprised of thin pellicles of inorganic material.

8. The adaptive lens apparatus of claim 7, the inorganic material being silicon nitride.

9. The adaptive lens apparatus of claim 1, the at least one actuator being piezoelectrically driven.

* * * * *